United States Patent
Harris et al.

[11] Patent Number: 6,042,271
[45] Date of Patent: Mar. 28, 2000

[54] COMPOSITE BEARING STRUCTURES

[75] Inventors: Bernard Harris, Northbrook; Dennis E. Bozych, Downers Grove; Dawne A. White, Willowbrook, all of Ill.

[73] Assignee: Rexnord Corporation, Milwaukee, Wis.

[21] Appl. No.: 09/093,995

[22] Filed: Jun. 9, 1998

Related U.S. Application Data

[63] Continuation-in-part of application No. 08/725,358, Oct. 3, 1996, Pat. No. 5,762,424.

[51] Int. Cl.[7] ............................ F16C 33/20; F16G 13/06; F16D 3/28
[52] U.S. Cl. ......................... 384/299; 464/132; 474/207
[58] Field of Search ..................... 474/155, 156, 474/206, 207, 226, 228, 230, 231, 232; 464/128, 132, 112; 384/297, 298, 299, 300

[56] References Cited

U.S. PATENT DOCUMENTS

| | | | |
|---|---|---|---|
| 2,816,453 | 12/1957 | Frank et al. | 474/207 |
| 3,070,408 | 12/1962 | Reuter | 384/300 |
| 3,072,448 | 1/1963 | Melton et al. | 384/280 |
| 3,087,314 | 4/1963 | Jarvis et al. | 464/128 |
| 3,241,336 | 3/1966 | Nemtsov | 464/132 X |
| 3,355,200 | 11/1967 | Storch | 384/299 X |
| 3,502,380 | 3/1970 | Adinoff | 384/299 |
| 3,616,000 | 10/1971 | Butzow | 156/173 |
| 3,645,115 | 2/1972 | Shotwell et al. | 464/132 X |
| 3,700,295 | 10/1972 | Butzow et al. | 308/72 |
| 3,782,797 | 1/1974 | Lange et al. | 464/128 X |
| 3,948,574 | 4/1976 | Baylor | 474/207 X |
| 3,974,009 | 8/1976 | Butzow et al. | 156/84 |
| 4,199,199 | 4/1980 | Granda | 474/207 X |
| 4,681,215 | 7/1987 | Martin | 384/222 X |
| 4,932,927 | 6/1990 | Fillar | 474/207 |
| 5,265,965 | 11/1993 | Harris et al. | 384/208 |
| 5,288,354 | 2/1994 | Harris et al. | 156/154 |
| 5,806,658 | 9/1998 | Hannum | 474/207 X |

Primary Examiner—Thomas R. Hannon
Attorney, Agent, or Firm—Quarles & Brady LLP

[57] ABSTRACT

A link chain comprising a first left side link including an end having therein an aperture, a first right side link laterally spaced from the first left link and including an end having therein an aperture in alignment with the aperture of the first left link, a bushing fixed in the apertures in the first left and right side links and including a bore having an axis, and an annular inwardly facing bearing surface, a second left side link located adjacent and axially outwardly of the end of the first left side link and including an end having therein an aperture located in axial alignment with the bore of the bushing, a second right side link laterally spaced from the second left side link, located adjacent and axially outwardly of the end of the first right side link, and including an end having therein an aperture located in axial alignment with the bore of the bushing, and a hinge pin fixed in the apertures of the second left and right side links, extending through the bore of the bushing, and including a composite bearing with an annular outwardly facing self-lubricating bearing surface in engagement with the inwardly facing bearing surfaces of the bore of the bushing.

13 Claims, 3 Drawing Sheets

COMPOSITE BEARING STRUCTURES

RELATED APPLICATION

This application is a continuation-in-part of U.S. application Ser. No. 08/725,358, filed Oct. 3, 1996 now U.S. Pat. No. 5,762,424, which is incorporated herein by reference.

BACKGROUND OF THE INVENTION

The invention relates to composite self-lubricating bearings, and more particularly to link chains and universal couplings.

In the past, link chains comprising links including respective apertures, together with bushings respectively fixed in the apertures, and hinge pins respectively extending through the bushings were known. In these past constructions, the bushings included composite bearings with annular, inwardly facing self-lubricating bearing surfaces in engagement with the hinge pins. In these past constructions, the tension loads transmitted during linear and arcuate movement and between the bushings and the hinge pins occurred along a line extending axially of the composite bearings and the resulting wear on the composite bearings was concentrated along this line.

Also in the past, universal joints comprising generally identical first and second members respectively including pairs of spaced arms with aligned apertures, together with composite bushings respectively fixed in the apertures of the spaced arms and respectively including inwardly facing self-lubricating bearing surfaces, were known. These past constructions also included a yoke member including a central portion, together with a first pair of axially spaced and aligned stub shafts which extended radially outwardly from the central portion and into engagement with the inwardly facing self-lubricating surfaces of the bushings fixed in the first member, and a second pair of axially spaced and aligned stub shafts extending radially outwardly from the central portion in 90 degree angular relation to the first pair of stub shafts and into engagement with the inwardly facing self-lubricating surfaces of the bushings fixed in the second member. As in the case of the link chains referred to above, the loads transmitted during arcuate relative movement between the yoke member and first and second members principally occurred along a line extending axially of the composite bearings and the resulting wear on the composite bearings was concentrated along this line.

Attention is directed to prior U.S. Pat. No. 5,265,965, issued Nov. 30, 1993, which is incorporated herein by reference. Attention is also directed to U.S. Pat. No. 3,700, 295, issued Oct. 24, 1972, and U.S. Pat. No. 3,974,009, issued Aug. 10, 1976. Attention is further directed to U.S. Pat. No. 5,288,354 issued Feb. 22, 1994, and incorporated herein by reference.

SUMMARY OF THE INVENTION

The invention provides a link chain comprising a first side link including therein an aperture, a bushing fixed in the aperture in the first side link and including therein a bore having an axis, and an annular inwardly facing bearing surface, a second side link including therein an aperture located in axial alignment with the bushing of the first side link, and a hinge pin extending through the aperture of the second side link and through the bore of the bushing and including a composite bearing with an annular outwardly facing self-lubricating bearing surface in engagement with the inwardly facing bearing surfaces of the bore.

The invention also provides a link chain comprising a first left side link including an end having therein an aperture, a first right side link laterally spaced from the first left link and including an end having therein an aperture in alignment with the aperture of the first left link, a bushing fixed in the apertures in the first left and right side links and including a bore having an axis, and an annular inwardly facing bearing surface, a second left side link located adjacent and axially outwardly of the end of the first left side link and including an end having therein an aperture located in axial alignment with the bore of the bushing, a second right side link laterally spaced from the second left side link, located adjacent and axially outwardly of the end of the first right side link, and including an end having therein an aperture located in axial alignment with the bore of the bushing, and a hinge pin fixed in the apertures of the second left and right side links, extending through the bore of the bushing, and including a composite bearing with an annular outwardly facing self-lubricating bearing surface in engagement with the inwardly facing bearing surfaces of the bore of the bushing.

The invention also provides a link chain comprising a first side link including an aperture, a first bushing fixed in the aperture in the first side link and including a first bore with an annular inwardly facing bearing surface, a second side link including an aperture located in axial alignment with the aperture of the first side link, a second bushing fixed in the aperture in the second side link and including a second bore with an annular inwardly facing bearing surface located in axial alignment with the inwardly facing bearing surface of the first bushing, and a hinge pin extending through the first and second bores of the first and second bushings and including a composite bearing with an annular outwardly facing self-lubricating bearing surface in engagement with the inwardly facing bearing surfaces of the first and second bores of the first and second bushings.

The invention also provides a universal joint comprising a first member including a pair of spaced arms respectively including aligned apertures, bushings respectively fixed in the apertures of the spaced arms of the first member and respectively including bores having respective inwardly facing bearing surfaces, a second member including a pair of spaced arms respectively including aligned apertures, bushings respectively fixed in the apertures of the spaced arms of the second member and respectively including bores having respective inwardly facing bearing surfaces, and a yoke member including a central portion, a first pair of axially spaced and aligned stub shafts which extend radially outwardly from the central portion and into the bores of the bushings fixed in the first member, a second pair of axially spaced and aligned stub shafts extending radially outwardly from the central portion in 90 degree angular relation to the first pair of stub shafts and into the bores of the bushings fixed in the second member, first composite bearings respectively fixed on the first pair of axially spaced and aligned stub shafts and respectively including annular outwardly facing self-lubricating bearing surfaces in engagement with the inwardly facing bearing surfaces of the bushings fixed in the apertures of the spaced arms of the first member, and second composite bearings respectively fixed on the second pair of axially spaced and aligned stub shafts and respectively including annular outwardly facing self-lubricating bearing surfaces in engagement with the inwardly facing bearing surfaces of the bushings fixed in the apertures of the spaced arms of the second member.

Other features and advantages of the invention will become apparent to those skilled in the art upon review of the following detailed description, claims and drawings.

Figure 1:
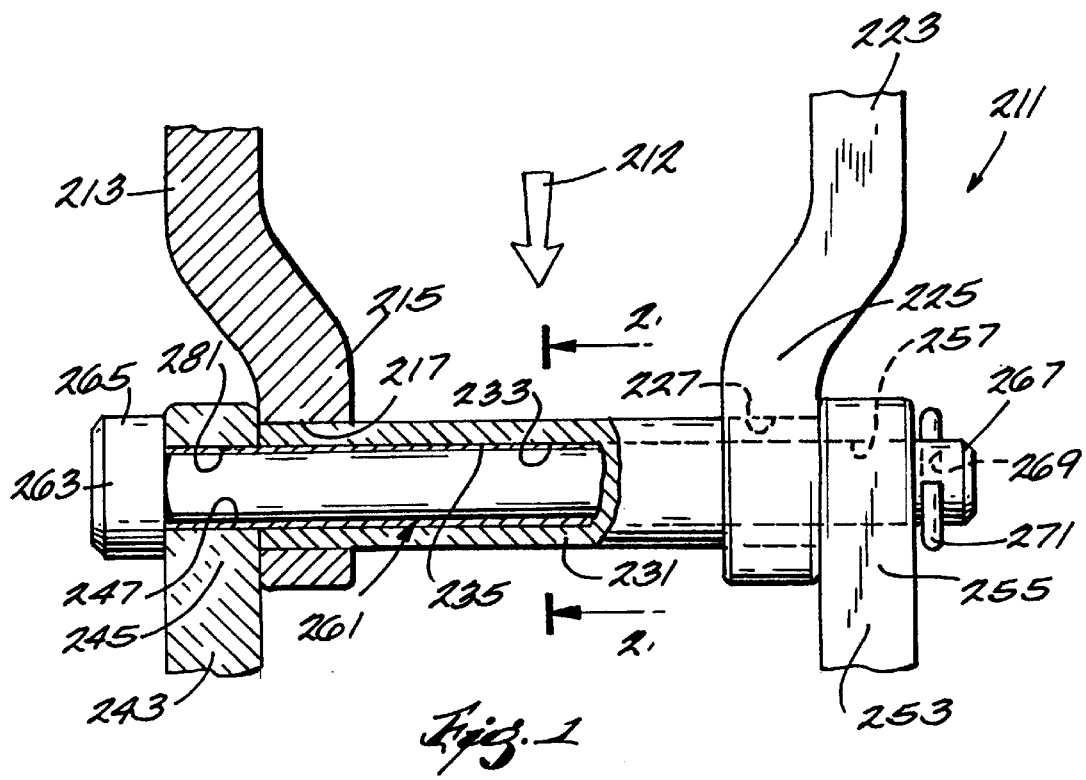
FIG. 1 is a partially broken away and sectioned top view of a first and preferred embodiment of a link chain which embodies various of the features of the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

Figure 2:
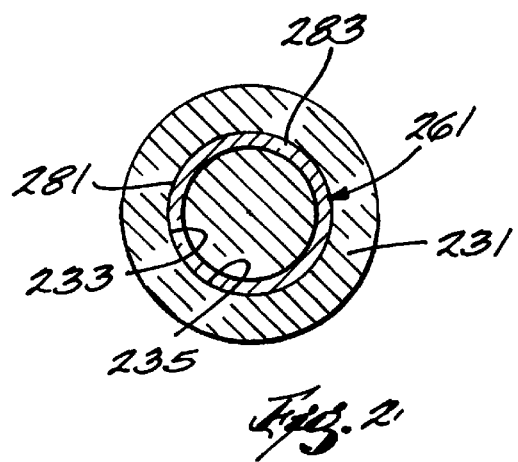
FIG. 2 is a sectional view taken along line 2—2 of FIG. 1.

Shown fragmentarily in FIGS. 1 and 2 of the drawings is a first embodiment of the invention in the form of a link chain 211 which is intended to advance in the direction of the arrow 212 and which is the preferred form of link chain construction. More specifically, the link chain 211 comprises a first or rearwardly located left side link 213 including a forward end 215 having therein an aperture 217, and a first or rearwardly located right side link 223 laterally spaced from the first left link 213 and including a forward end 225 having therein an aperture 227 in alignment with the aperture 217 of the first left link 213. The rearwardly located left and right side links 213 and 223 can be fabricated of any suitable material, such as steel, and can take any suitable configuration.

The link chain 211 also includes a bushing 231 which is fixed, as for example, by being press fitted, in the apertures 217 and 227 in the first left and right side links 213 and 223 and which includes a bore 233 having an axis, and an annular inwardly facing bearing surface 235 which is cylindrical in configuration. The bushing 231 can be fabricated of any suitable bearing material, such as steel.

The link chain 211 further includes a second or forwardly located left side link 243 located adjacent and axially outwardly of the forward end 215 of the first left side link 213 and including a rearward end 245 having therein an aperture 247 located in axial alignment with the bore 233 of the bushing 231, together with a second or forwardly located right side link 253 laterally spaced from the second left side link 243, located adjacent and axially outwardly of the forward end 225 of the first right side link 223, and including a rearward end 255 having therein an aperture 257 located in axial alignment with the bore 233 of the bushing 231. The forwardly located left and right side links 243 and 253 can be fabricated of any suitable material, such as steel, and can take any suitable configuration.

In addition, the link chain 211 also includes a hinge pin 261 which is fixed, as for example, by being press fitted, in the apertures 247 and 257 of the second left and right side links 243 and 253 and which extends through the bore 233 of the bushing 231. Preferably, the hinge pin 261 also includes a first end 263 having an enlarged head 265 located axially exteriorly of one of the second left and right side links 243 and 253, and a second end 267 extending axially exteriorly of the other one of the second left and right side links 243 and 253, and including therein a diametric bore 269. The hinge pin 261 can be fabricated of any suitable material, such as steel.

In addition, the link chain 211 preferably further includes a cotter pin 271 extending in the diametric bore 269 of the second end 267 of the hinge pin 261. As thus far disclosed the construction is conventional.

The link chain 11 also includes a composite bearing 281 which is fixed on the hinge pin 261, which extends substantially throughout the axial length of the bore 233 in the bushing 231, and which includes an annular outwardly facing self-lubricating bearing surface 283 which is in engagement with the inwardly facing bearing surface 235 of the bore 233 of the bushing 231, which is preferably cylindrical, and which is fabricated of self-lubricating fibers and resin.

Figure 3:
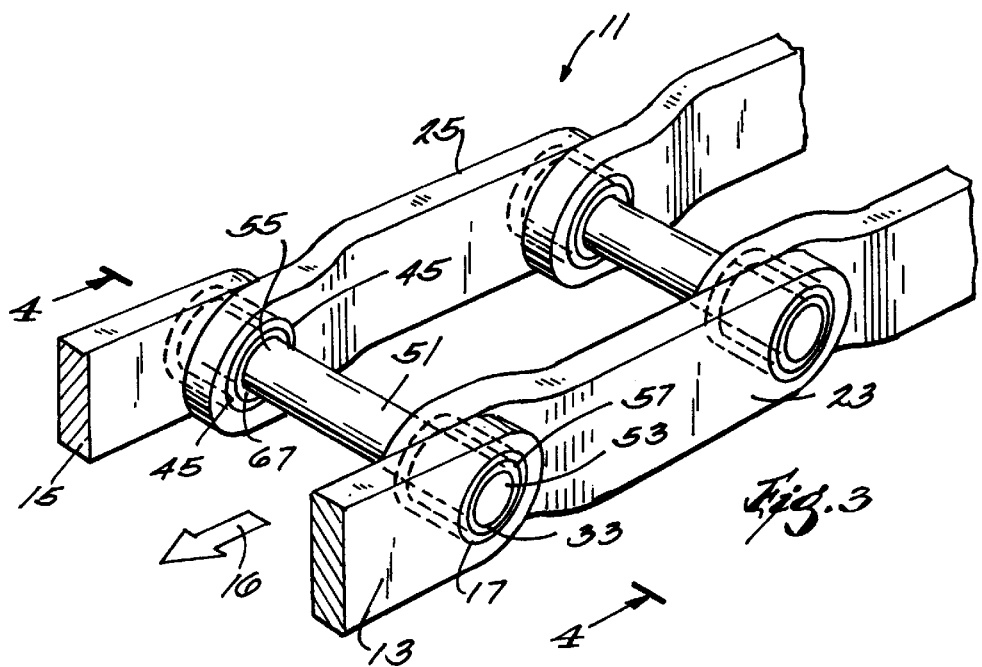
FIG. 3 is a perspective view of a second embodiment of a link chain which embodies various of the features of the invention.
Figure 4:
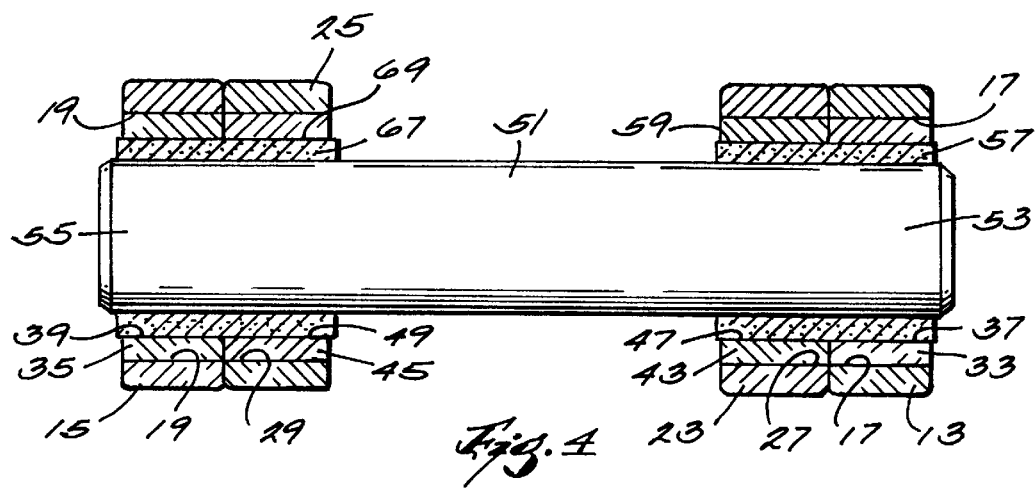
FIG. 4 is a fragmentary partially sectioned view taken along line 4—4 of FIG. 3.

Shown in FIGS. 3 and 4 is a second embodiment of the invention in the form of link chain 11 which comprises a first pair of laterally spaced, left and right side links 13 and 15 which are located forwardly with respect to the direction of intended link chain advance as indicated by the arrow 16 and which respectively include axially aligned apertures 17 and 19 which, preferably, are cylindrical in shape. The link chain 11 also includes a second pair of laterally spaced left and right side links 23 and 25 which are located rearwardly with respect to the direction of intended link chain advance and which respectively include axially aligned apertures 27 and 29 which, preferably, are cylindrical in shape and which are located in axial alignment with the apertures 17 and 19 of the first pair of forwardly located side links 13 and 15. The side links 13, 15, 23, and 25 can be fabricated of any suitable material, such as steel, and can take any suitable configuration.

The link chain 11 also includes left and right bushings 33 and 35 which are respectively fixed in the apertures 17 and 19 in the pair of forwardly located left and right side links 13 and 15 and which respectively include bores with respective annular inwardly facing and axially aligned bearing surfaces 37 and 39 which, preferably, are cylindrical in configuration. The link chain 11 also includes left and right bushings 43 and 45 which are respectively fixed in the apertures 27 and 29 in the rearwardly located pair of left and right side links 23 and 25 and which respectively include bores with respective annular inwardly facing and axially aligned bearing surfaces 47 and 49 which, preferably, are cylindrical in configuration and which are located in axial alignment with the inwardly facing bearing surfaces 37 and 39 of the first mentioned bushings 33 and 35. The bushings 33, 35, 43, and 45 can be fabricated of any suitable bearing material, such as steel, and are respectively fixed in the side links 23, 25, 33, and 35 in any suitable manner, such as, for instance, by being respectively press-fitted into the apertures 17, 19, 27, and 29.

The link chain 11 also includes a hinge pin 51 which includes a right end 53 extending through the bores of the bushings 33 and 43 located in the forwardly and rearwardly located left side links 13 and 23, and a left end 55 extending through the bores of the bushings 35 and 45 located in the forwardly and rearwardly located right side links 15 and 25.

The hinge pin 51 can be fabricated of any suitable material, such as steel. As thus far disclosed the construction of the link chain 11 is conventional.

The link chain 11 also includes a composite bearing 57 which is fixed on the right end 53 of the hinge pin 51 and which includes an annular outwardly facing self-lubricating bearing surface 59 in engagement with the inwardly facing bearing surfaces 37 and 47 of the bores of the first and second left bushings 33 and 43. Preferably, the outwardly facing self-lubricating bearing surface 57 is cylindrical in configuration.

The link chain 11 also includes another composite bearing 67 which is fixed on the left end 55 of the hinge pin 51 and which include an annular outwardly facing self-lubricating bearing surface 69 in engagement with the inwardly facing bearing surfaces 39 and 49 of the bores of the first and second right bushings 15 and 25. Preferably, the outwardly facing self-lubricating bearing surface 69 is cylindrical in configuration.

Figure 5:
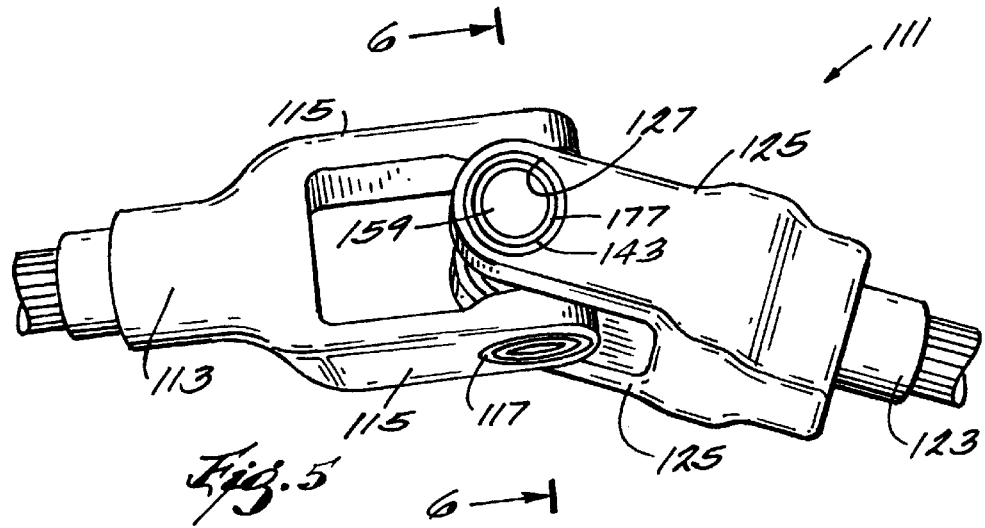
FIG. 5 is a fragmentary perspective view of one embodiment of a universal joint which embodies various of the features of the invention.
Figure 6:
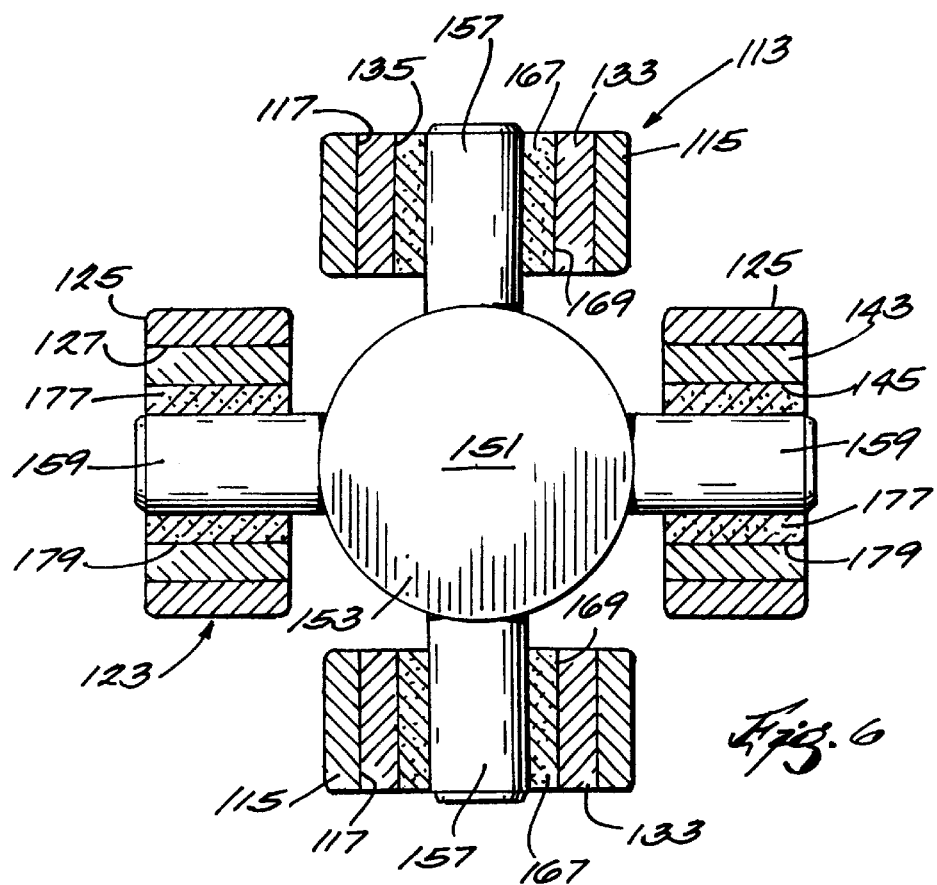
FIG. 6 is a fragmentary partially sectioned view taken along line 6—6 of FIG. 5.

Shown in FIGS. 5 and 6 is another embodiment of the invention in the form of a universal joint 111 which comprises a first member or fork 113 including a pair of spaced arms 115 respectively including aligned apertures 117, and a second member or fork 123 including a pair of spaced arms 125 respectively including aligned apertures 127. The first and second members 113 and 123 can be fabricated of any suitable material, such as steel, and are generally of identical construction.

The universal joint 111 also includes a first pair of bushings 133 which are respectively fixed in the apertures 117 of the spaced arms 115 of the first member 113 and which respectively include bores having respective inwardly facing bearing surfaces 135 which, preferably, are cylindrical in configuration.

The universal joint 111 further includes a second pair of bushings 143 respectively fixed in the apertures 127 of the spaced arms 125 of the second member 123 and respectively including bores having respective inwardly facing bearing surfaces 145 which, preferably, are cylindrical in configuration. The bushings 133 and 143 can be fabricated of any suitable material, such as steel.

The universal joint 111 further includes a centrally located yoke member 151 which is shown best in FIG. 6 and which includes a central or hub portion 153, together with a first pair of axially spaced and aligned stub shafts 157 which extend outwardly from the central or hub portion 153 and into the bores of the spaced bushings 133 of the first member 113. In addition, the centrally located yoke member 151 includes a second pair of axially spaced and aligned stub shafts 159 which extend outwardly from the central or hub portion 153 in 90 degree angular relation to the first pair of stub shafts 157 and into the bores of the spaced bushings 143 of the second member 123.

The centrally located yoke member 151 also includes first composite bearings 167 respectively fixed on the first pair of axially spaced and aligned stub shafts 157 and respectively including annular outwardly facing self-lubricating bearing surfaces 169 which, preferably, are cylindrical in configuration. The outwardly facing self-lubricating bearing surfaces 169 are located in engagement with the inwardly facing bearing surfaces 135 of the bushings 133 fixed in the apertures 117 of the spaced arms 115 of the first member 113.

The centrally located yoke member 151 also includes second composite bearings 177 respectively fixed on the second pair of axially spaced and aligned stub shafts 159 and respectively including annular outwardly facing self-lubricating bearing surfaces 179 which, preferably, are cylindrical in configuration. The outwardly facing self-lubricating bearing surfaces 179 are located in engagement with the inwardly facing bearing surfaces 145 of the bushings 143 fixed in the apertures 127 of the spaced arms 125 of the second member 123.

The composite bearings 57, 59, 167, 177, and 281 included in the link chains 11 and 211 and in the universal joint 111 described above, can be formed on the outer surface of the respective hinge pins 51 and 261 and on the stub shafts 157 and 159 to provide the self-lubricating surfaces 47, 49, 169, 179 and 283, in the general manner disclosed in U.S. Pat. No. 3,616,000, which issued Oct. 26, 1971, which is entitled "SEAMLESS FABRIC-LINED BEARING OF MULTIPLE-LENGTH CONSTRUCTION", and which is incorporated herein by reference. While other constructions can be employed, in the composite bearings 57, 59, 167, 177, and 281 included in the link chains 11 and 211 and in the universal joint 111 described above, the composite bearings 57, 59, 167, 177, and 281, are fabricated of self-lubricating fibers and resin and are suitably bonded or otherwise fixed to the underlying hinge pins 51 and 261 and stub shafts 157 and 159.

The disclosed link chains 11 and 211 and universal joint 111 provide the advantage of spreading the wear on the outwardly facing self-lubricating surfaces 47, 49, 169 179, and 283 of the hinge pins 51 and 261 and stubs shafts 157 and 159 over an arcuate and axially extending area, as compared to the concentration of the wear along an axially extending line on the inwardly facing self-lubricating surfaces of the prior bushings. This spreading of the wear over an axially extending arcuate area, as compared to the prior occurrence of wear substantially only along an axially extending line, and the relocation of the wear from the inwardly facing self-lubricating surfaces of the prior constructions to the outwardly facing self-lubricating surfaces 47, 49, 169 179, and 283 of the disclosed hinge pins 51 and 211 and stub shafts 157 and 159 results in a substantially longer useful bearing life.

Various of the features are set forth in the following claims.

We claim:

1. A link chain comprising a first side link including therein an aperture, a bushing fixed in said aperture in said first side link and including therein a bore having an axis, and an annular inwardly facing bearing surface, a second side link including therein an aperture located in axial alignment with said bushing of said first side link, and a hinge pin fixed in said aperture of said second side link for common movement therewith and extending through said bore of said bushing and including a composite bearing with an annular outwardly facing self-lubricating bearing surface in engagement with said inwardly facing bearing surfaces of said bore.

2. A link chain in accordance with claim 1 wherein said outwardly facing self-lubricating bearing surface is cylindrical.

3. A link chain in accordance with claim 1 wherein said composite bearing is fabricated of self-lubricating fibers and resin.

4. A link chain comprising a first left side link including an end having therein an aperture, a first right side link laterally spaced from said first left link and including an end having therein an aperture in alignment with said aperture of said first left link, bushings respectively fixed in said apertures in said first left and right side links and including respective bores respectively having an axis, and an annular inwardly facing bearing surface, a second left side link located adjacent and axially outwardly of said end of said first left side link and including an end having therein an aperture located in axial alignment with said bore of said bushing, a second right side link laterally spaced from said second left side link, located adjacent and axially outwardly of said end of said first right side link, and including an end having therein an aperture located in axial alignment with said bore of said bushing, and a hinge pin fixed in said apertures of said second left and right side links for common movement therewith, extending through said bores of said bushings, and including a composite bearing with an annular outwardly facing self-lubricating bearing surface in fixed engagement in said apertures of said second left and right side links and in rotatable engagement with said inwardly facing bearing surfaces of said bores of said bushings.

5. A link chain in accordance with claim 4 wherein said outwardly facing self-lubricating bearing surface is cylindrical.

6. A link chain in accordance with claim 4 wherein said composite bearing is fabricated of self-lubricating fibers and resin.

7. A link chain in accordance with claim 4 wherein said hinge pin includes a first end having an enlarged head located axially exteriorly of one of said second left and right side links, and a second end extending axially exteriorly of the other one of said second left and right side links, and including therein a diametric bore, and wherein said link chain further includes a cotter pin extending in said diametric bore.

8. A link chain comprising a first side link including an aperture, a bushing fixed in said aperture in said first side link and including a bore with an annular inwardly facing bearing surface, a second side link including an aperture having an annular inwardly facing surface located in axial alignment with said inwardly facing bearing surface of said bushing, and a hinge pin extending through said bore of said bushing and through said aperture of said second link and including a composite bearing with an annular outwardly facing self-lubricating bearing surface in fixed engagement in said aperture of said second side link and in rotatable engagement with said inwardly facing bearing surface of said bore of said bushing.

9. A link chain in accordance with claim 8 wherein said outwardly facing self-lubricating bearing surface is cylindrical.

10. A link chain in accordance with claim 8 wherein said composite bearing is fabricated of self-lubricating fibers and resin.

11. A link chain comprising a first pair of forwardly located and laterally spaced left and right side links respectively including axially aligned apertures, first left and right bushings respectively fixed in said apertures in said first pair of left and right side links and respectively including first bores with respective annular inwardly facing and axially aligned bearing surfaces, a second pair of rearwardly located and laterally spaced left and right side links respectively including axially aligned apertures located in axial alignment with said apertures of said first pair of side links, second left and right bushings respectively fixed in said apertures in said second pair of left and right side links and respectively including second bores with respective annular inwardly facing and axially aligned bearing surfaces located in axial alignment with said inwardly facing bearing surfaces of said first bushings, a hinge pin including a left end extending through said bores of said first and second left side links, a right end extending through said bores of said first and second right side links, a first composite bearing fixed on said left end of said hinge pin and including an annular outwardly facing self-lubricating bearing surface in engagement with said inwardly facing bearing surfaces of said bores of said first and second left bushings, and a second composite bearing fixed on said right end of said hinge pin and including an annular outwardly facing self-lubricating bearing surface in engagement with said inwardly facing bearing surfaces of said bores of said first and second right bushings.

12. A link chain in accordance with claim 11 wherein said outwardly facing self-lubricating bearing surface is cylindrical.

13. A link chain in accordance with claim 11 wherein said composite bearing is fabricated of self-lubricating fibers and resin.

\* \* \* \* \*